(12) United States Patent
Kowalczyk et al.

(10) Patent No.: US 7,657,148 B2
(45) Date of Patent: Feb. 2, 2010

(54) CABINET INCLUDING OPTICAL BULKHEAD PLATE FOR BLOWN FIBER SYSTEM

(75) Inventors: Scott Kowalczyk, Savage, MN (US); Douglas C. Ellens, Eden Prairie, MN (US); James J. Solheid, Lakeville, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/970,439

(22) Filed: Jan. 7, 2008

(65) Prior Publication Data

US 2008/0212928 A1 Sep. 4, 2008

Related U.S. Application Data

(62) Division of application No. 11/249,726, filed on Oct. 13, 2005, now Pat. No. 7,330,626.

(60) Provisional application No. 60/713,622, filed on Aug. 31, 2005.

(51) Int. Cl.
G02B 6/00 (2006.01)

(52) U.S. Cl. .................. 385/135; 385/134; 385/136; 385/137; 385/138

(58) Field of Classification Search ................. 385/135; 174/50
See application file for complete search history.

(56) References Cited

U.S. PATENT DOCUMENTS

| | | | | |
|---|---|---|---|---|
| 4,776,662 A | * | 10/1988 | Valleix | 385/137 |
| 4,818,054 A | * | 4/1989 | George et al. | 385/135 |
| 5,231,687 A | | 7/1993 | Handley | |
| 5,535,298 A | * | 7/1996 | Fasnacht et al. | 385/135 |
| 5,661,840 A | * | 8/1997 | Caveney | 385/135 |
| 5,696,864 A | * | 12/1997 | Smith et al. | 385/135 |
| 5,930,111 A | * | 7/1999 | Yamazaki et al. | 361/690 |
| 6,438,310 B1 | | 8/2002 | Lance et al. | |
| 6,487,356 B1 | * | 11/2002 | Harrison et al. | 385/135 |
| 6,504,988 B1 | | 1/2003 | Trebesch et al. | |
| 6,621,975 B2 | * | 9/2003 | Laporte et al. | 385/135 |
| 6,798,966 B2 | * | 9/2004 | Loh | 385/134 |
| 6,853,781 B2 | | 2/2005 | Chastain et al. | |
| 6,885,798 B2 | * | 4/2005 | Zimmel | 385/100 |
| 7,079,744 B2 | | 7/2006 | Douglas et al. | |

(Continued)

FOREIGN PATENT DOCUMENTS

EP 0 350 245 A2 1/1990

(Continued)

OTHER PUBLICATIONS

"ACE-100 and 200DS Above Ground Enclosure," pp. 1-15 (Aug. 1998).

(Continued)

*Primary Examiner*—Ryan Lepisto
(74) *Attorney, Agent, or Firm*—Merchant & Gould P.C.

(57) ABSTRACT

A cabinet is provided for managing the connections between a feeder cable and a distribution cable wherein the distribution cable is a blown optical fiber. The cabinet includes shelves for holding splices between the feeder cable and the distribution cable. The shelves also include microduct holders for holding each of the microducts associated with the distribution cable.

14 Claims, 23 Drawing Sheets

U.S. PATENT DOCUMENTS

2003/0190134 A1* 10/2003 Tsai et al. .................. 385/135
2004/0086252 A1* 5/2004 Smith et al. ................. 385/135
2005/0002633 A1 1/2005 Solheid et al.
2005/0105873 A1 5/2005 Reagan et al.
2005/0129379 A1 6/2005 Reagan et al.
2005/0281526 A1* 12/2005 Vongseng et al. .......... 385/135
2006/0008231 A1 1/2006 Reagan et al.

FOREIGN PATENT DOCUMENTS

| EP | 0 463 749 A2 | 1/1992 |
|---|---|---|
| EP | 0 903 595 A2 | 3/1999 |
| GB | 2 355 600 A | 4/2001 |
| WO | WO 00/54087 | 9/2000 |
| WO | WO 00/75706 A2 | 12/2000 |
| WO | WO 01/96921 A2 | 12/2001 |

OTHER PUBLICATIONS

"Blown Fiber. HPW Solutions," http://www.hubbell-premise.com/BlownFiber.asp, 1 page (Date Printed Aug. 2, 2005).
"Distribution and Termination Equipment. Fiber Termination Accessories," 1 page (admitted as prior art as of Aug. 31, 2005).
"Fiber Cable Management Products," Third Edition, pp. 1-137 (Jun. 1998).
"Fiber Outside Plant Systems," pp. 1-11 (Aug. 1998).
"Fiber Panel Products," Second Edition, pp. 1-111 (Jul. 1996).
"Secure Fiber Entrance Terminal (SFET)," pp. 1-7 (May 1998).

* cited by examiner

CABINET INCLUDING OPTICAL BULKHEAD PLATE FOR BLOWN FIBER SYSTEM

CROSS-REFERENCE TO RELATED APPLICATION

This application is a divisional of U.S. patent application Ser. No. 11/249,726 filed on Oct. 13, 2005, the disclosure of which is hereby incorporated by reference in its entirety and which claims the benefit of U.S. Provisional Application Ser. No. 60/713,622, filed Aug. 31, 2005, the disclosure of which is hereby incorporated by reference in its entirety.

FIELD OF THE INVENTION

The present invention relates to fiber distribution cabinets for holding fiber optic telecommunications terminations and equipment.

BACKGROUND OF THE INVENTION

Fiber distribution cabinets are known for holding and managing fiber optic cables, splices, and terminations for cables extending to and from the cabinets. In some cases, the cables extending to and from the cabinets are underground cables. In some systems, conduit is laid between a remote site and a cabinet and then optical fiber is blown through the conduit when needed at a later time.

There is a need for cabinets which hold and manage the fiber optic cables, splices, and terminations, as well as interfacing with the conduit through which blown fibers are provided.

SUMMARY OF THE INVENTION

The present invention relates to cabinets and methods including an enclosure which has a first cable entry and a second cable entry. The cabinet includes structure within the interior for connecting the first cable to the second cable. In one preferred embodiment, a plurality of shelves or trays is provided for holding the connections, such as the splices between the first and second cables. The trays also include holders for holding the conduit including microducts which are used to receive blown fiber as part of the first or second cables.

DETAILED DESCRIPTION OF THE PREFERRED EMBODIMENT

Figure 1:
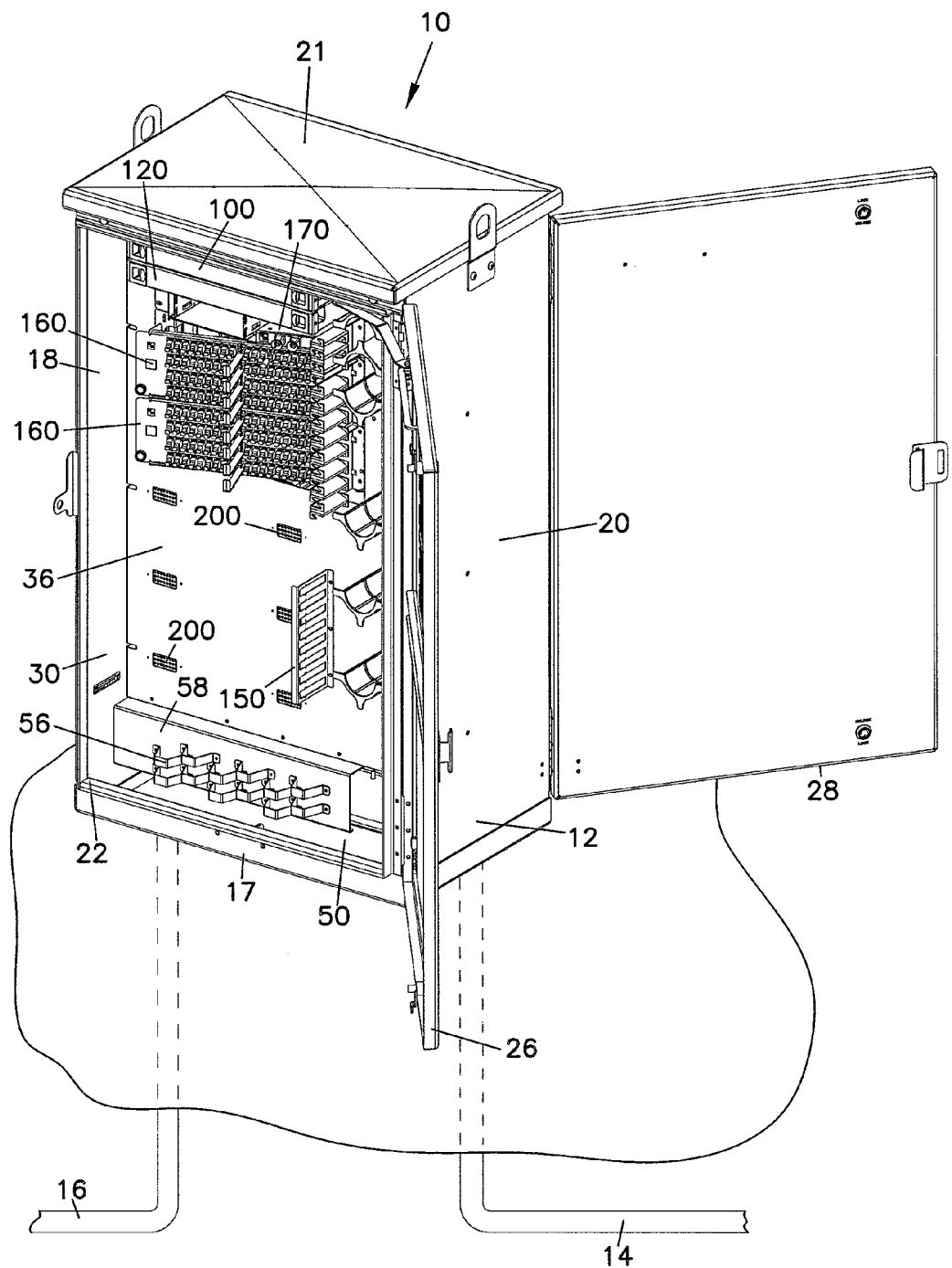
FIG. 1 is a front perspective view of a fiber optic distribution cabinet, shown with both front and rear doors open.
Figure 2:
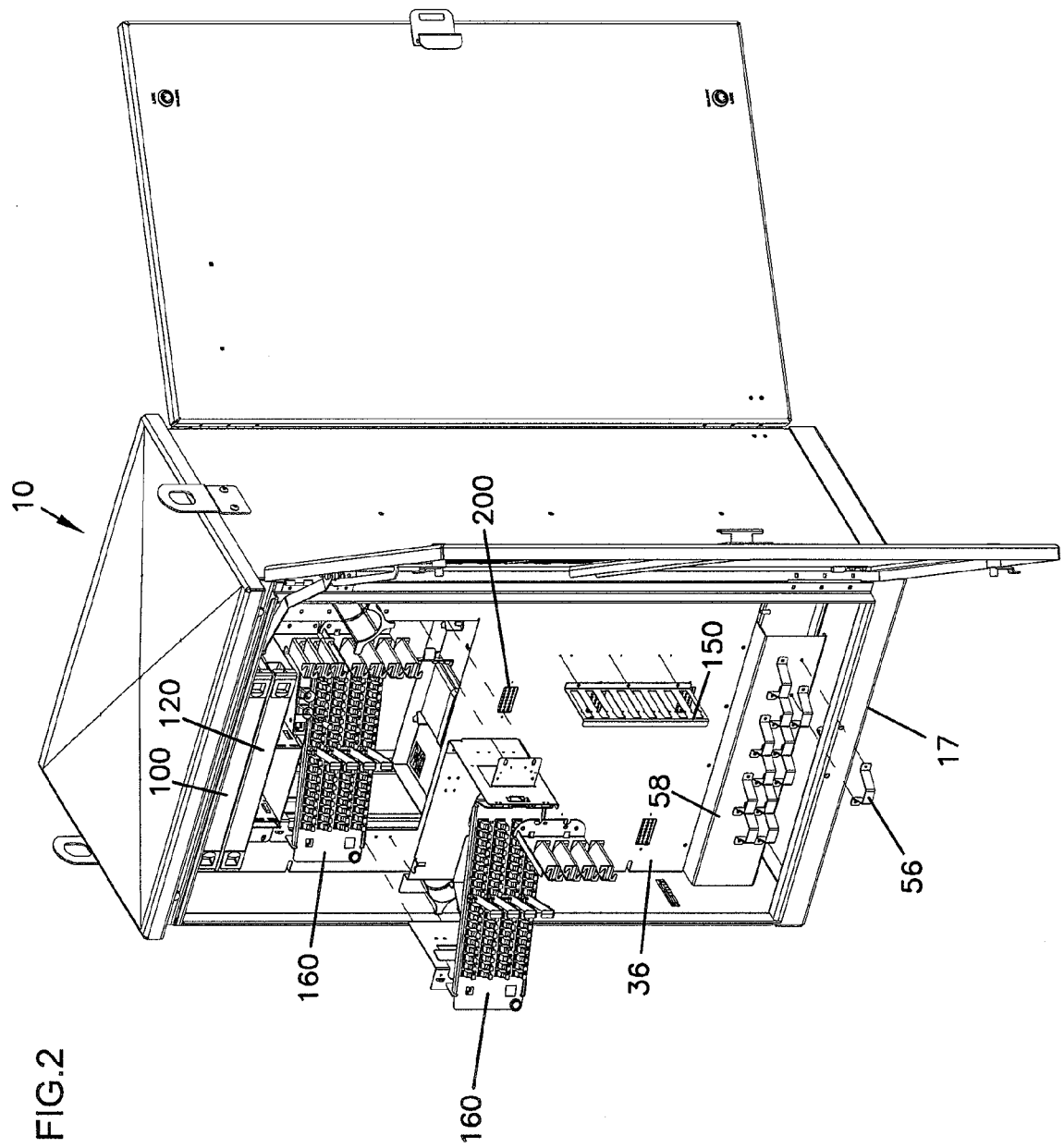
FIG. 2 is a partial exploded front perspective view of the distribution cabinet of FIG. 1.
Figure 3:
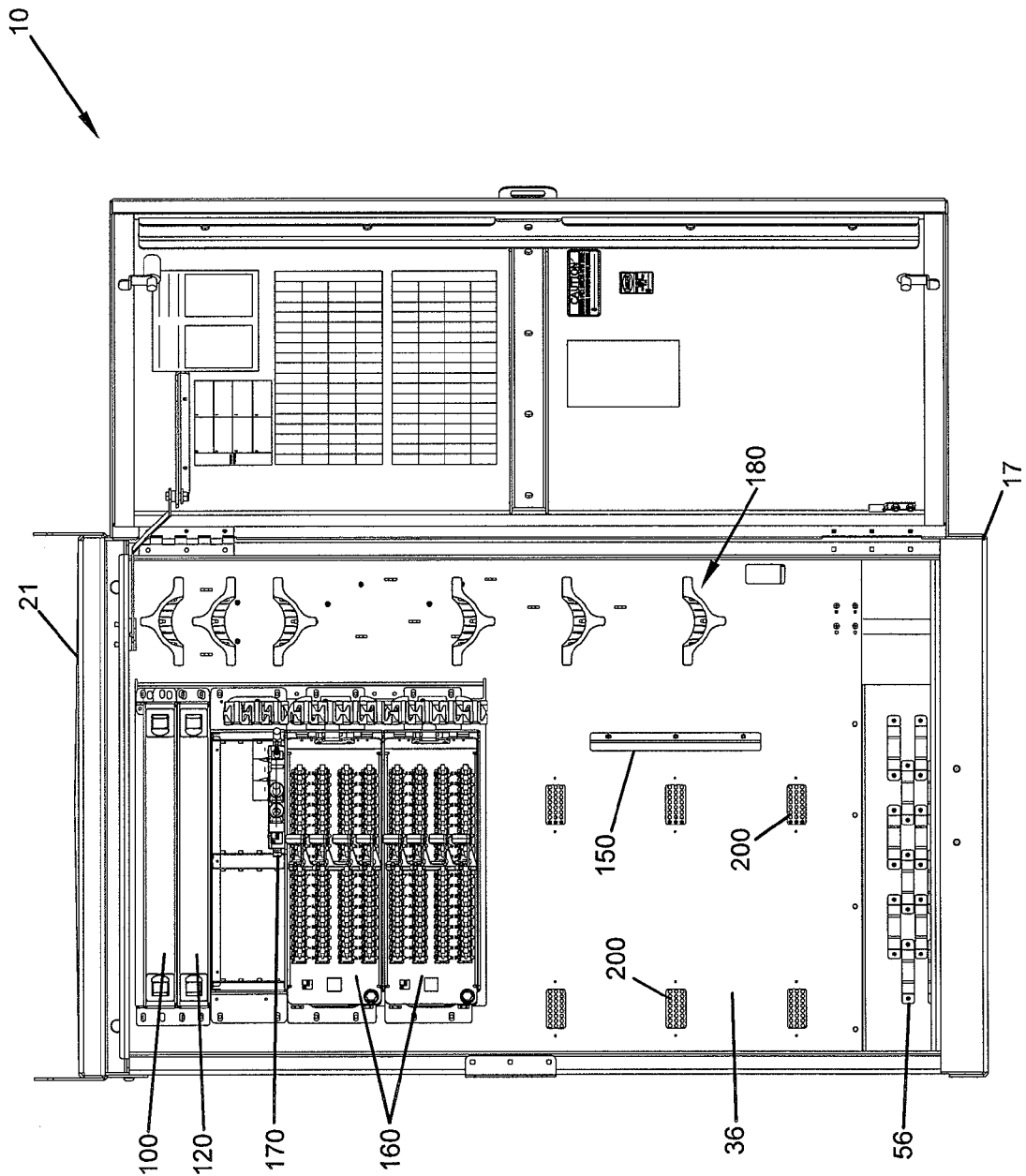
FIG. 3 is a front elevational view of the distribution cabinet of FIG. 1.
Figure 4:
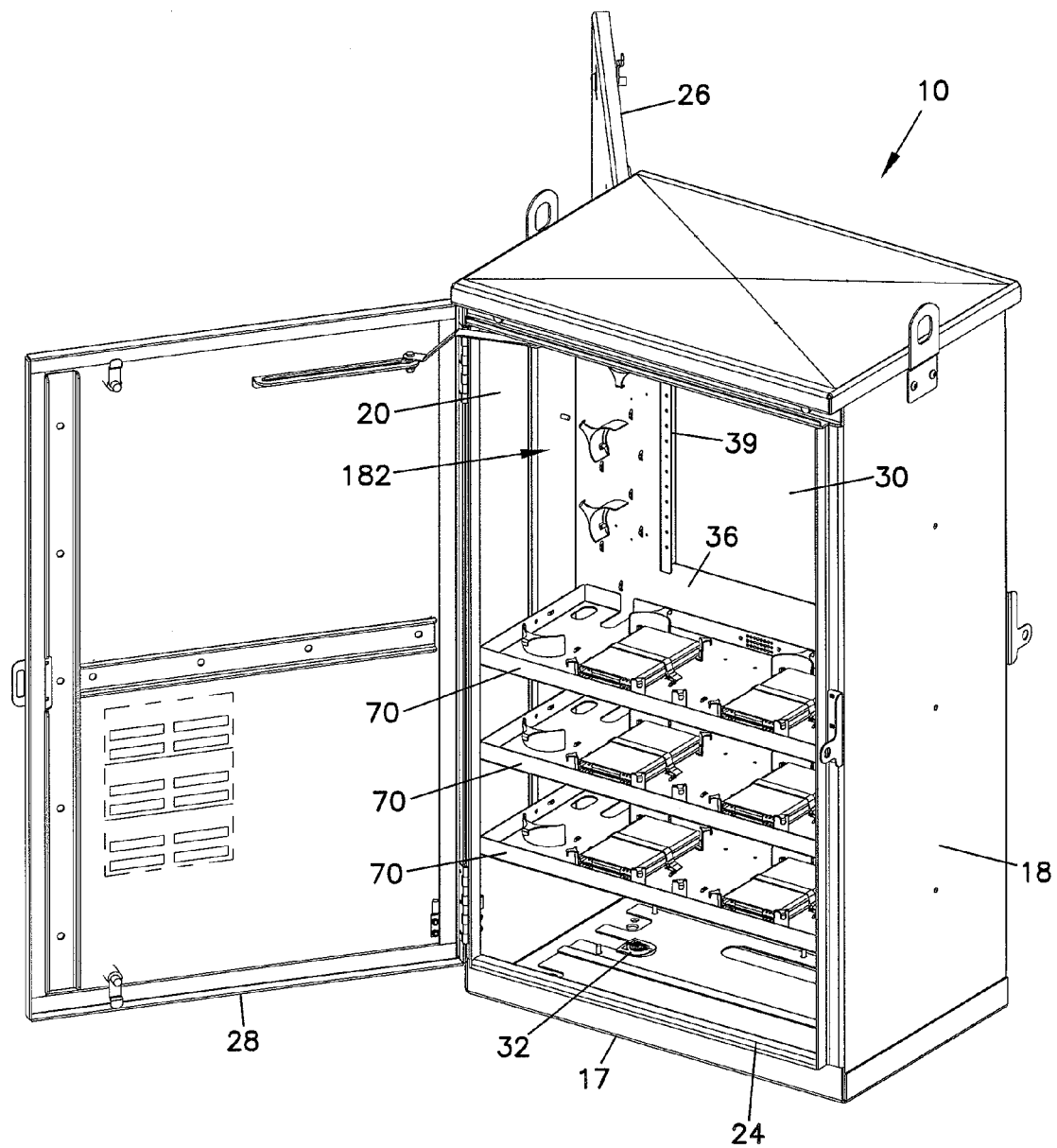
FIG. 4 is a rear perspective view of the distribution cabinet of FIG. 1 with portions removed.
Figure 5:
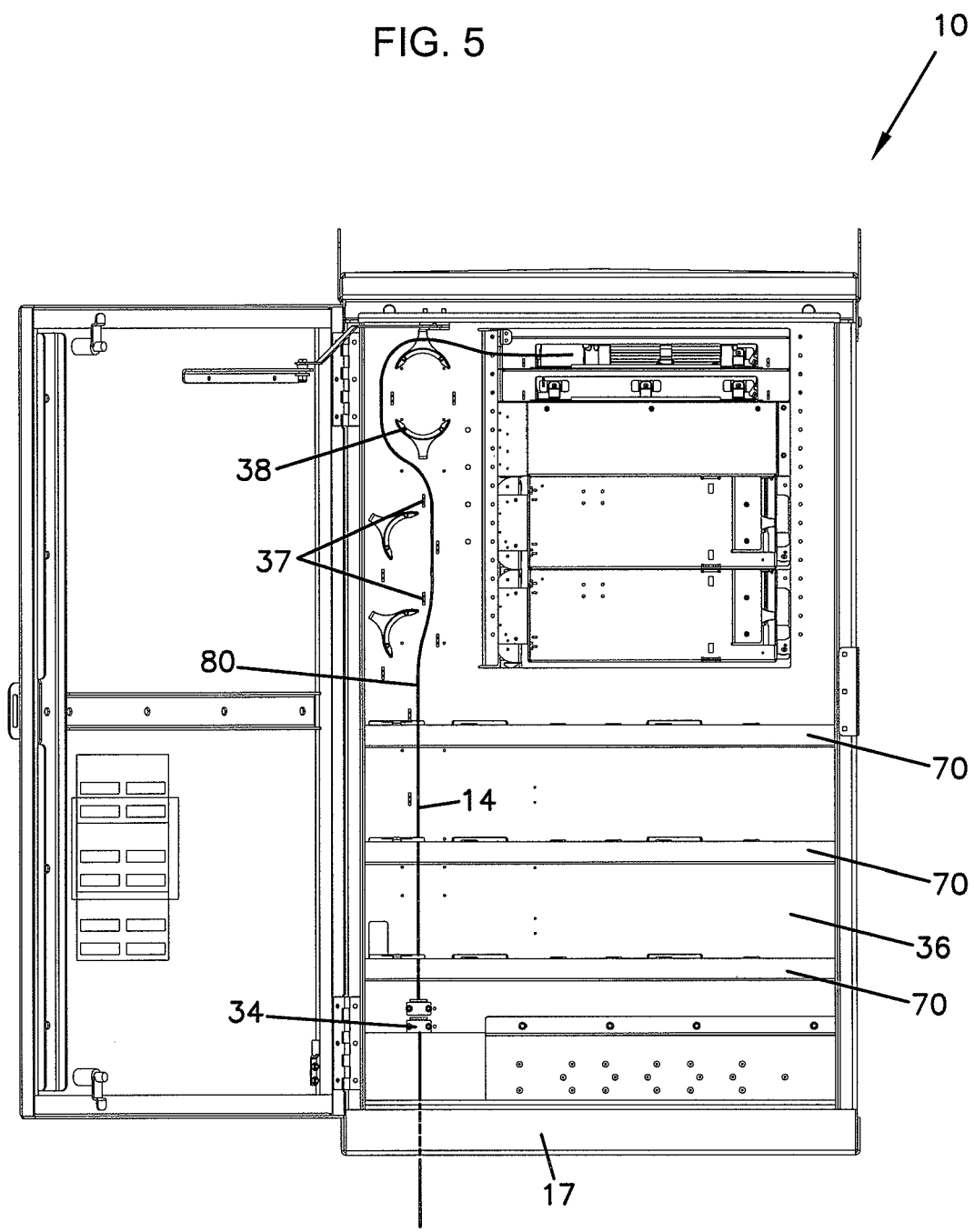
FIG. 5 is a rear elevational view of the cabinet of FIG. 1, showing feeder subunit cables routed to a splice drawer.
Figure 6:
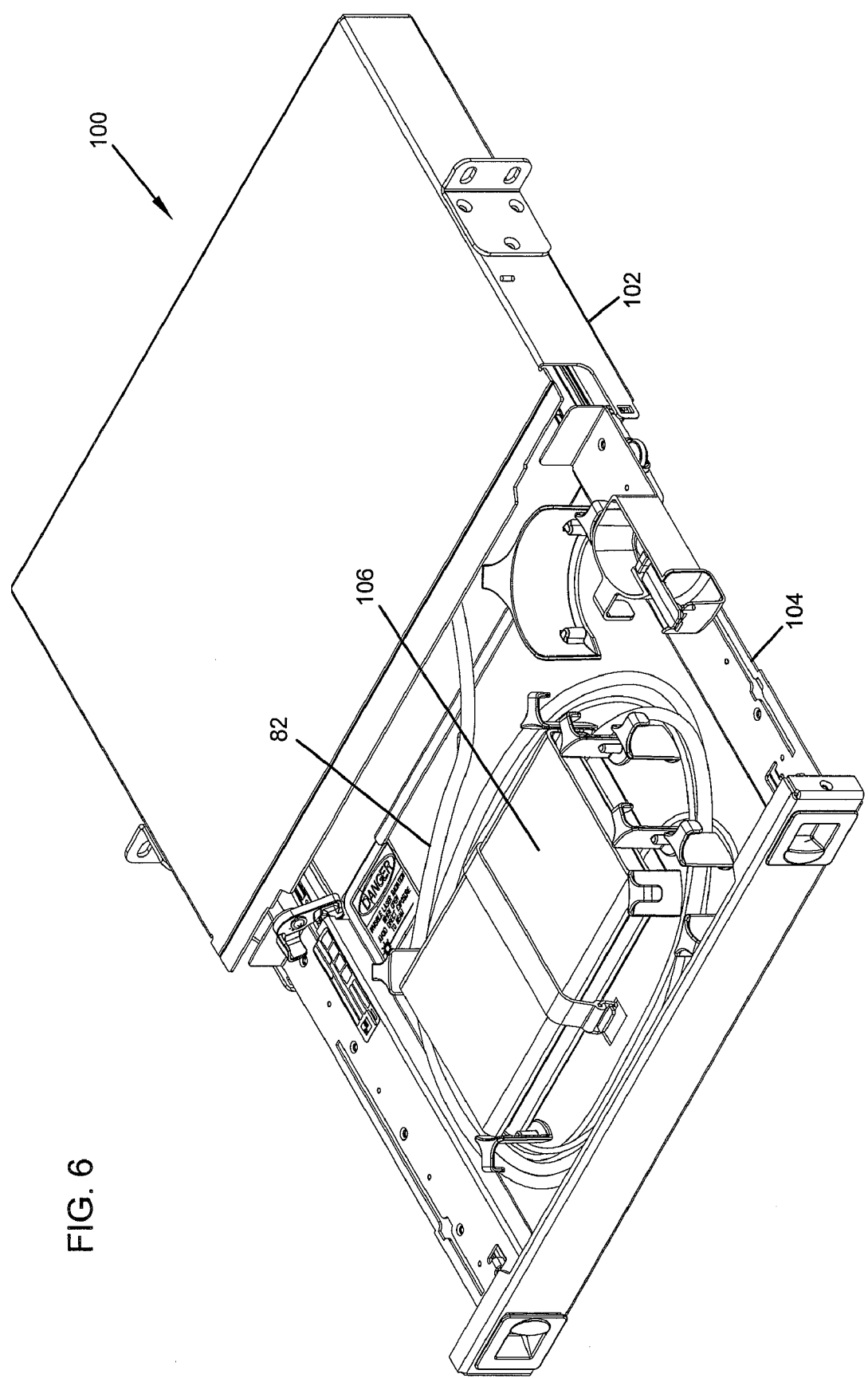
FIG. 6 is a top perspective of the splice drawer showing feeder pigtails connected to splice trays in the splice drawer.
Figure 7:
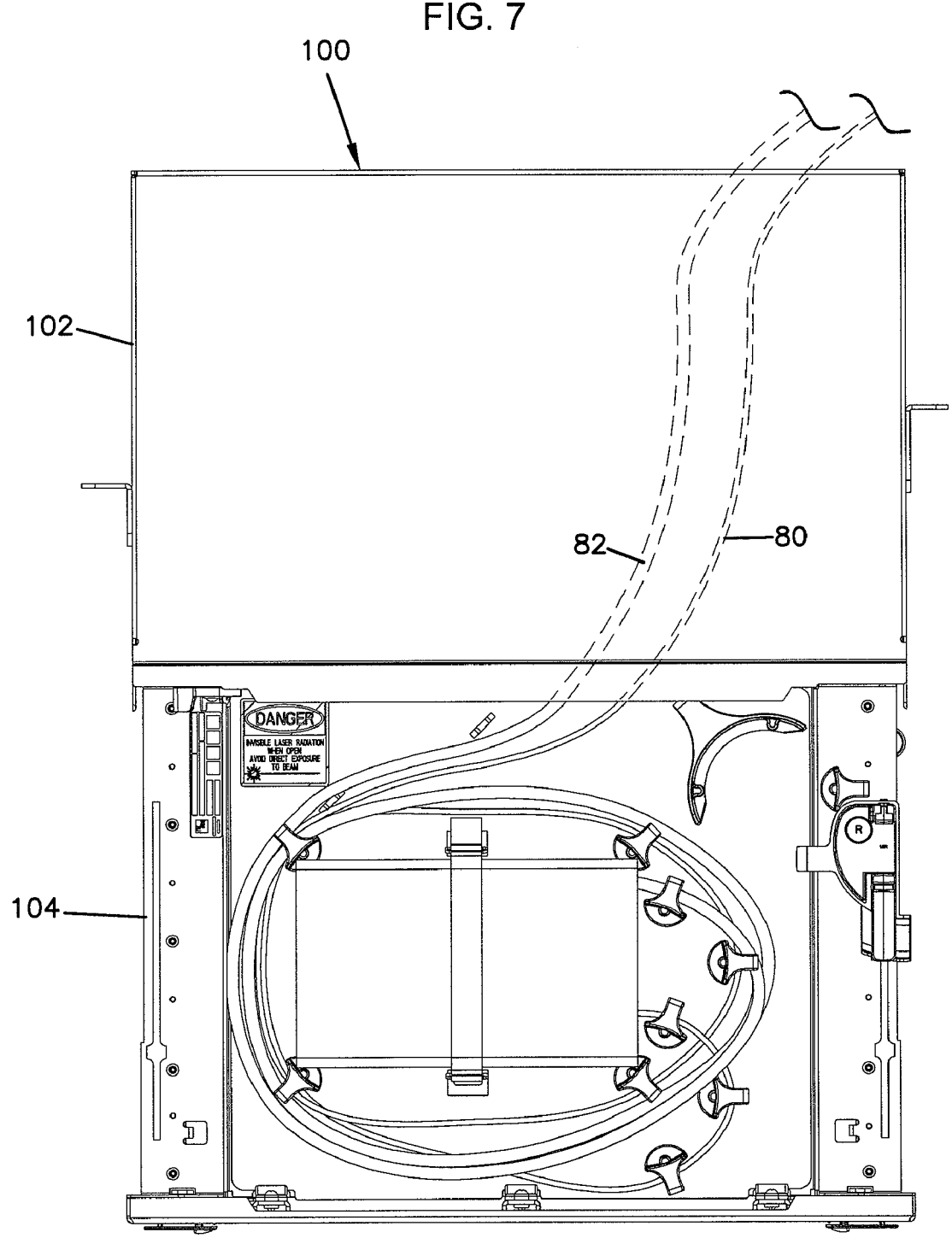
FIG. 7 is a top view of the splice drawer of FIG. 6, showing the feeder subunit cables joined to the feeder pigtails at the splice trays.
Figure 8:
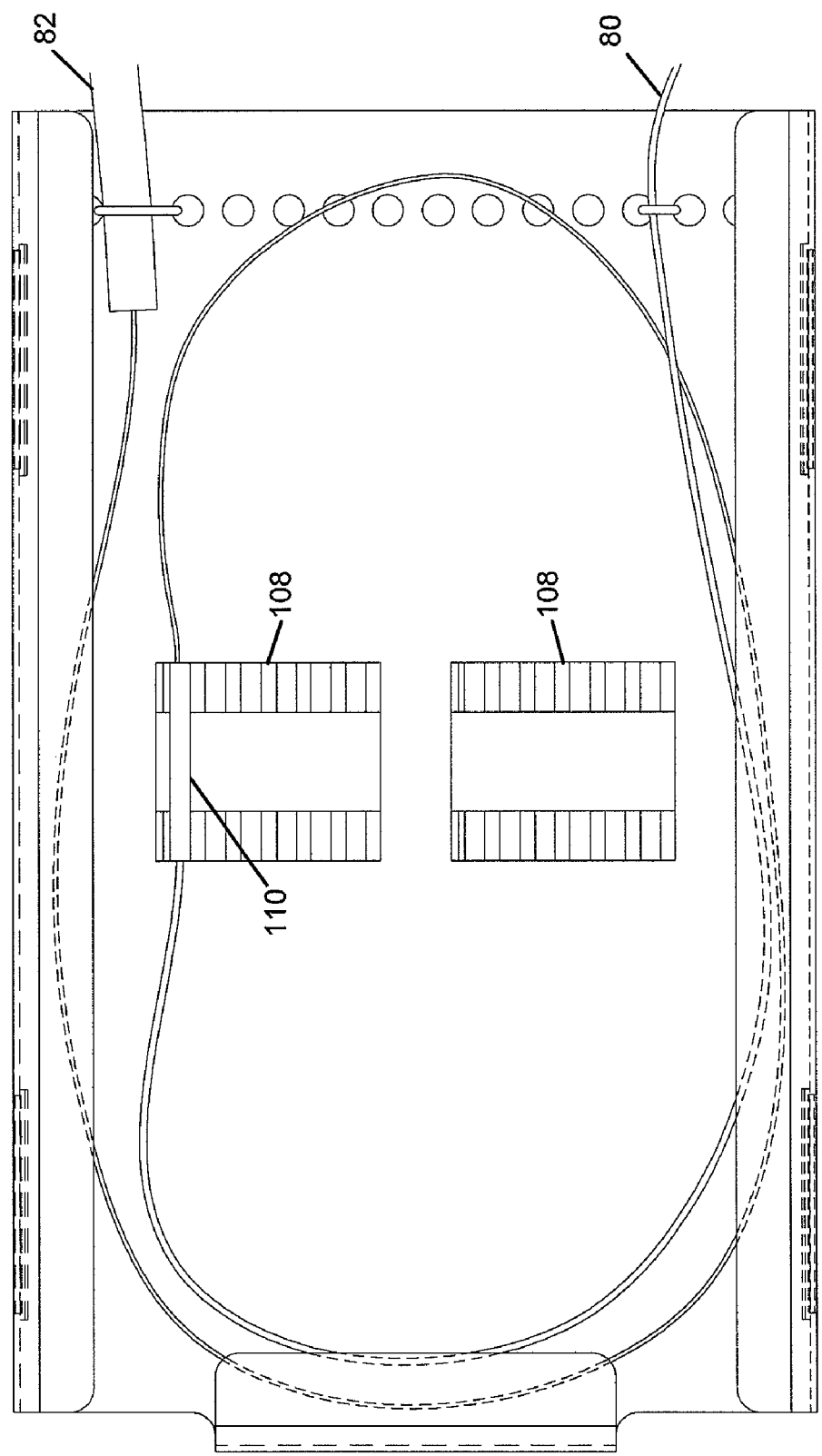
FIG. 8 is a top view of one of the splice trays of the splice drawer of FIG. 6, showing one fiber splice.

Referring now to FIGS. 1-4 and 23, one preferred embodiment of a telecommunications fiber distribution cabinet 10 is shown. Cabinet 10 includes an enclosure 12 for housing connections between a first cable 14 and a second cable 16. In one embodiment, first cable 14 is a feeder cable, and second cable 16 is a distribution cable. As will be described below, enclosure 12 houses the connections between individual optical fibers associated with each of first and second cables 14, 16. Cabinet 10 is also useful in interfacing with hollow conduit, such as ducts, which can be used for later insertion of optical fibers, such as with a blowing operation.

Cabinet 10 includes a base 17, first and second sides 18, 20, an open front 22, and an open rear 24. First and second pivotally mounted doors 26, 28 are mounted adjacent to open front 22 and open rear 24, respectively. Enclosure 12 defines an enclosed interior 30 which receives first and second cables 14, 16 and holds and manages the connections between the cables.

Referring also now to FIGS. 5-22 in addition to FIGS. 1-4 and 23, cabinet 10 includes a first cable entry 32 through base 17. First cable 14 can be clamped with a clamp 34. Typically first cable 14 is an underground cable entering cabinet 10 from beneath base 17. Clamp 34 can be mounted to an inner vertical panel 36 which further includes cable ties 37 and a cable manager 38. Such devices are useful for guiding first cable 14 to the various interconnection structures within cabinet 10.

Cabinet 10 also includes a second cable entry 50 allowing second cable 16 to enter cabinet 10. In the illustrated embodiment, second cable 16 is also an underground cable entering cabinet 10 from beneath base 17. Second cable 16 includes an outer conduit 52 with a plurality of inner microducts 54. Conduit 52 is clamped with a clamp 56 to a clamp panel 58. Microducts 54 are typically installed for later use when an optical fiber interconnection is desired. Cable installation devices are known which insert optical fibers into hollow ducts, such as through a blowing operation which uses pressurized air to install the optical fiber in the duct. Cabinet 10 allows for initial placement conduit 52 with microducts 54 where the optical fibers 60 are installed at a later date in microducts 54.

A plurality of trays or shelves 70 hold ends 62 of microducts 54 with a microduct holder 200. Shelves 70 also hold fiber splices for joining fibers 60 to further fibers connected to first cable 14, as will be described below, thereby completing the connection between first cable 14 and second cable 16.

Referring now to FIGS. 6-8 and 23, first cable 14 in the form of feeder subunit cables 80 enter splice drawer 100. Splice drawer 100 includes a chassis 102 and a moveable tray 104. Moveable tray 104 holds one or more splice trays 106. Splice trays 106 include splice chips 108 which hold the individual splices 110 between feeder subunit cables 80 and feeder pigtails 82.

Figure 9:
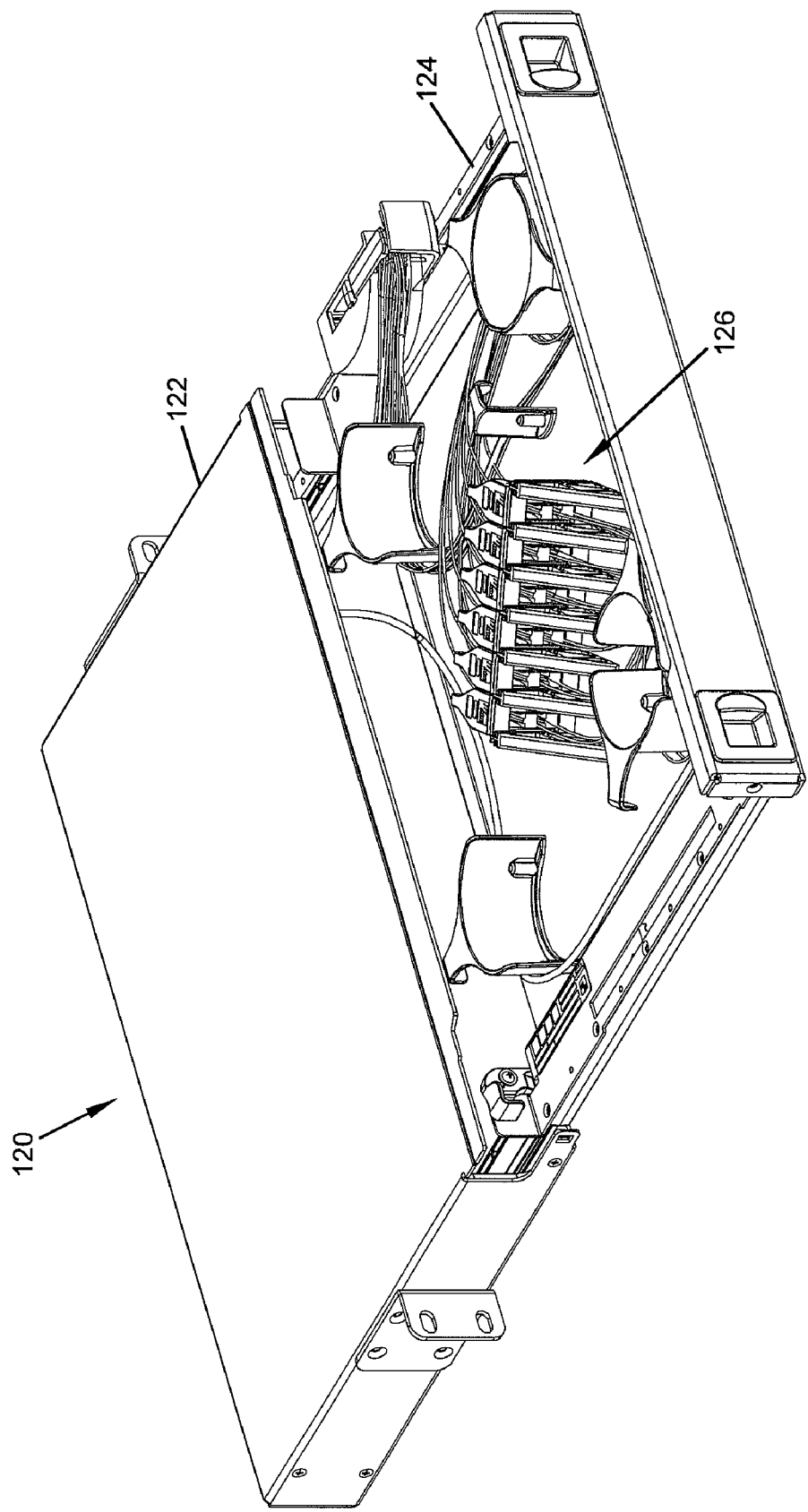
FIG. 9 is a top perspective view of a connector drawer of the cabinet of FIG. 1, showing the feeder pigtails joined to splitter input cables at a termination arrangement.
Figure 10:
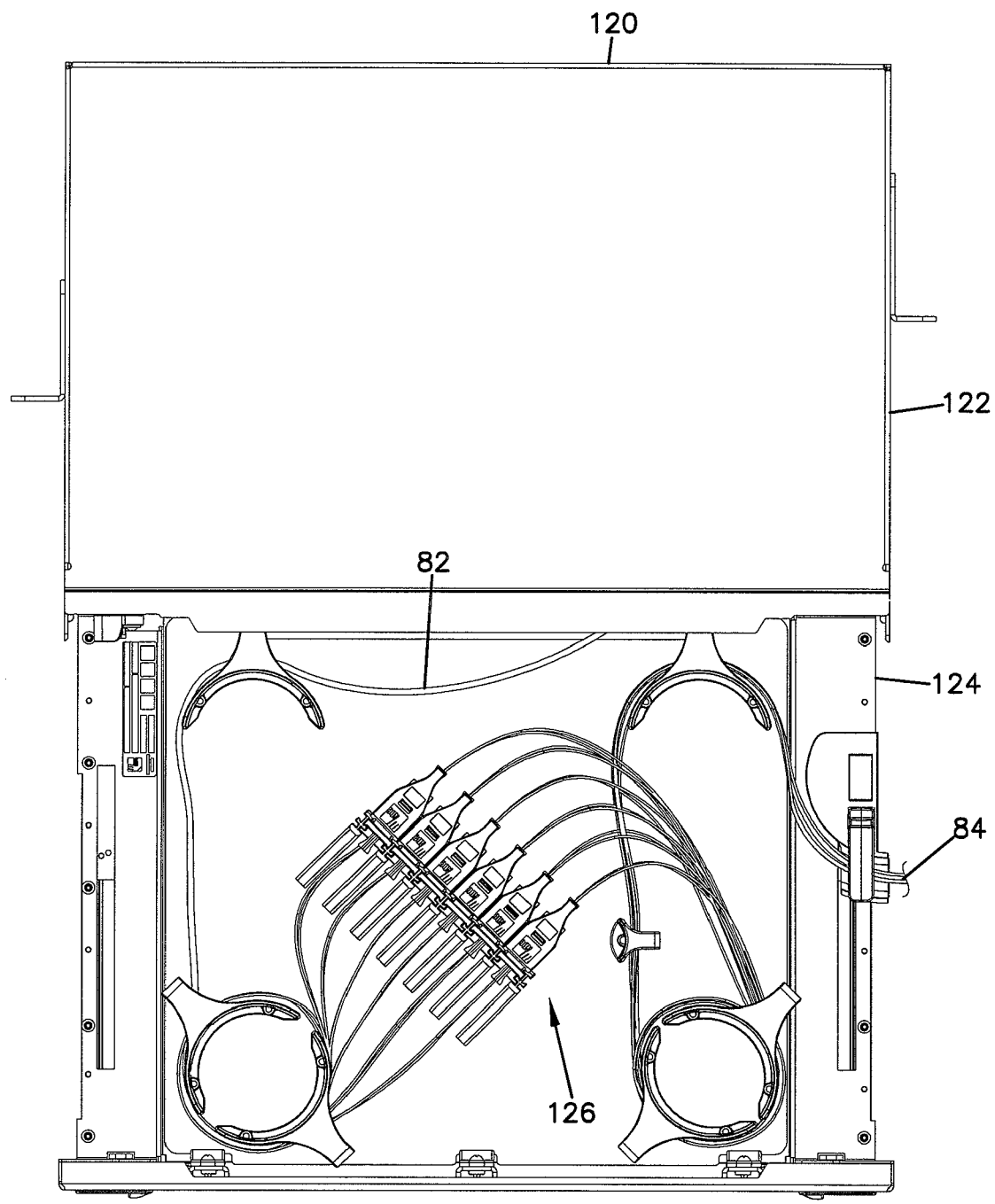
FIG. 10 is a top view of the connector drawer of FIG. 9.
Figure 11:
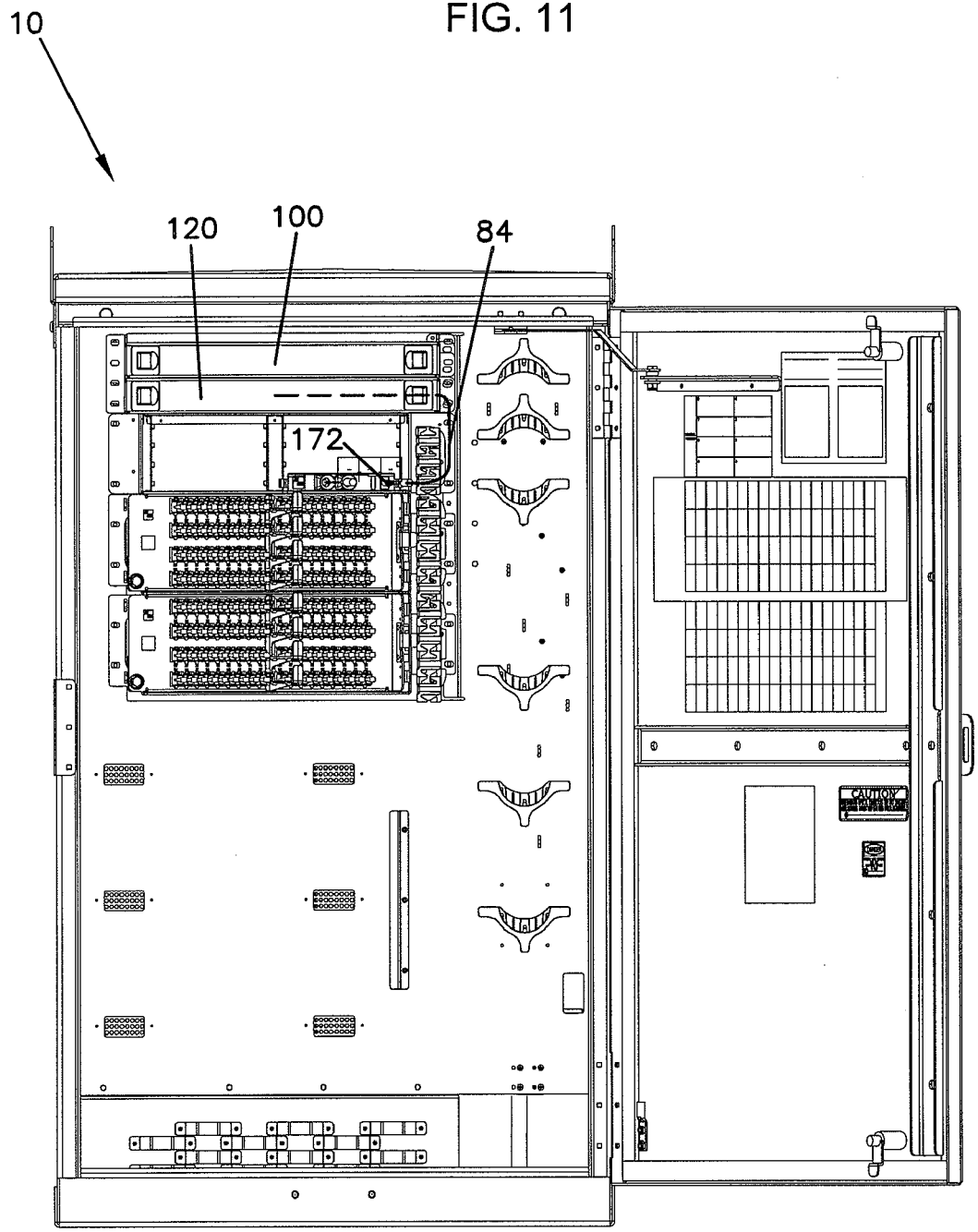
FIG. 11 is a front elevational view of the cabinet of FIG. 1, showing splitter input cables routed from the connector drawer to one of the splitter modules.
Figure 12A:
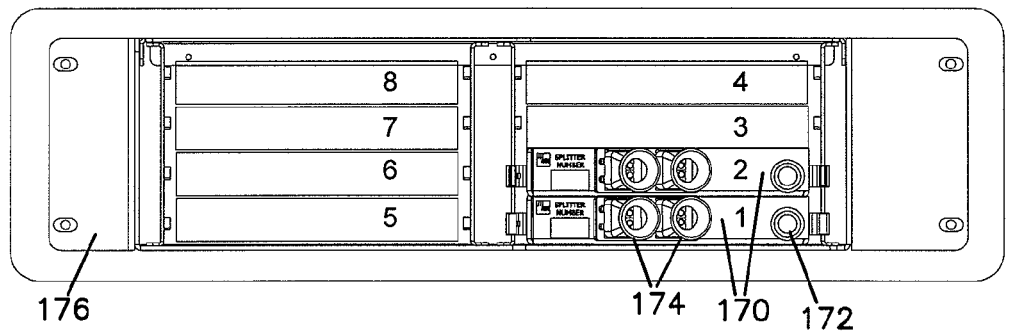
FIG. 12A is a front elevational view of a splitter chassis including two splitter modules.
Figure 12B:
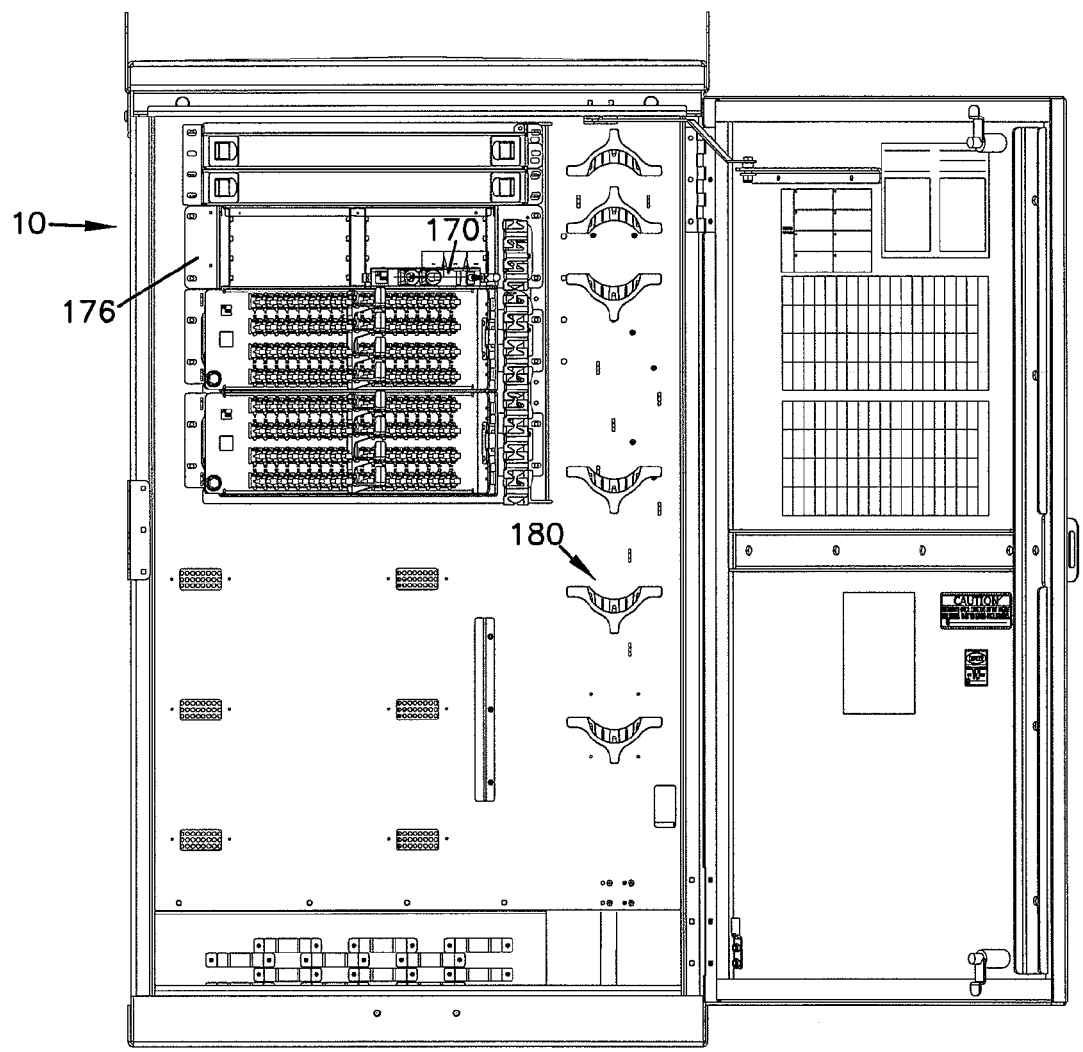
FIG. 12B is a front elevational view of the cabinet of FIG. 1, including the chassis of FIG. 12A with one splitter module.
Figure 13:
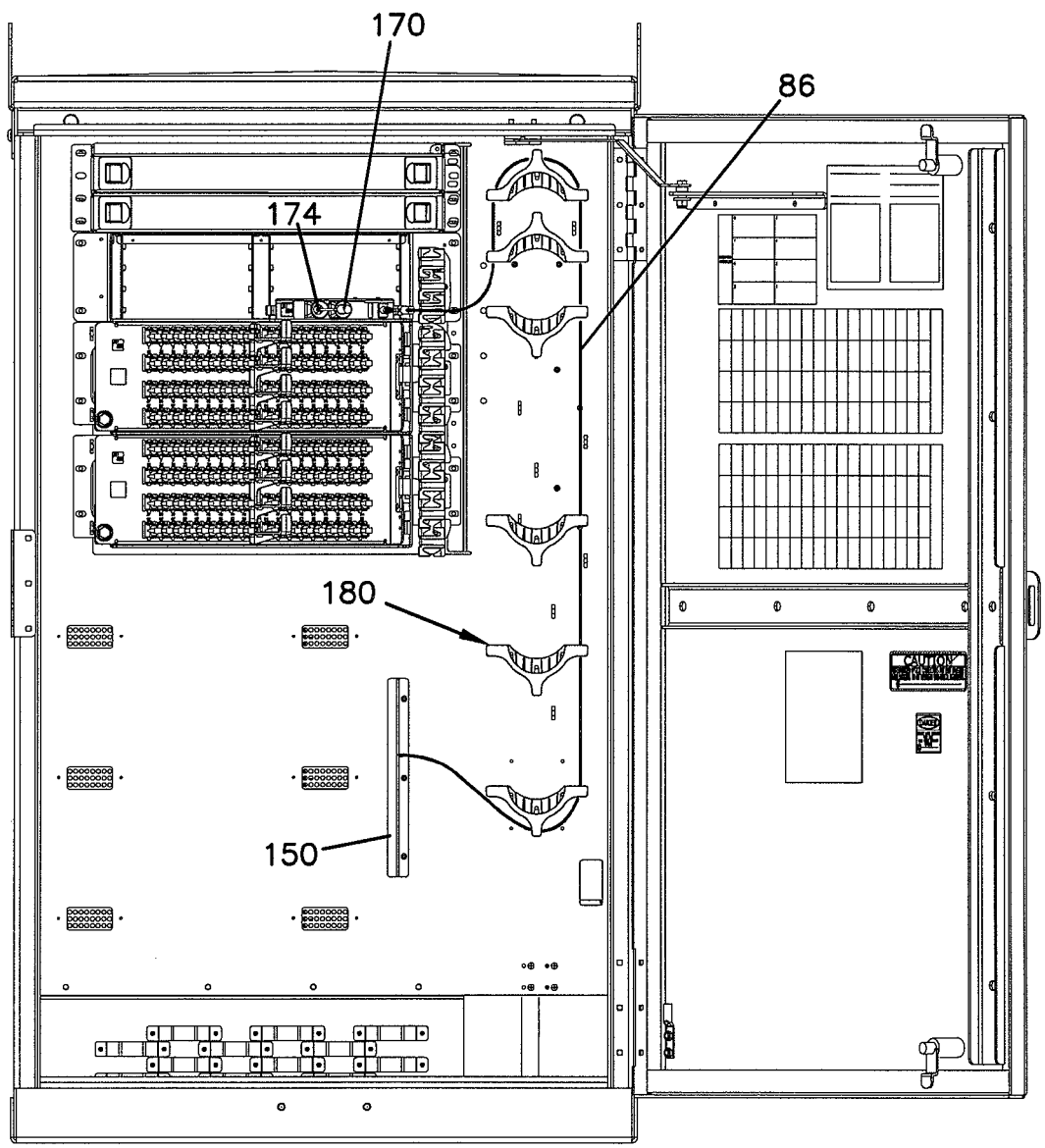
FIG. 13 is a front elevational view of the cabinet of FIG. 1, showing splitter output cables routed to a connector storage panel.
Figure 23:
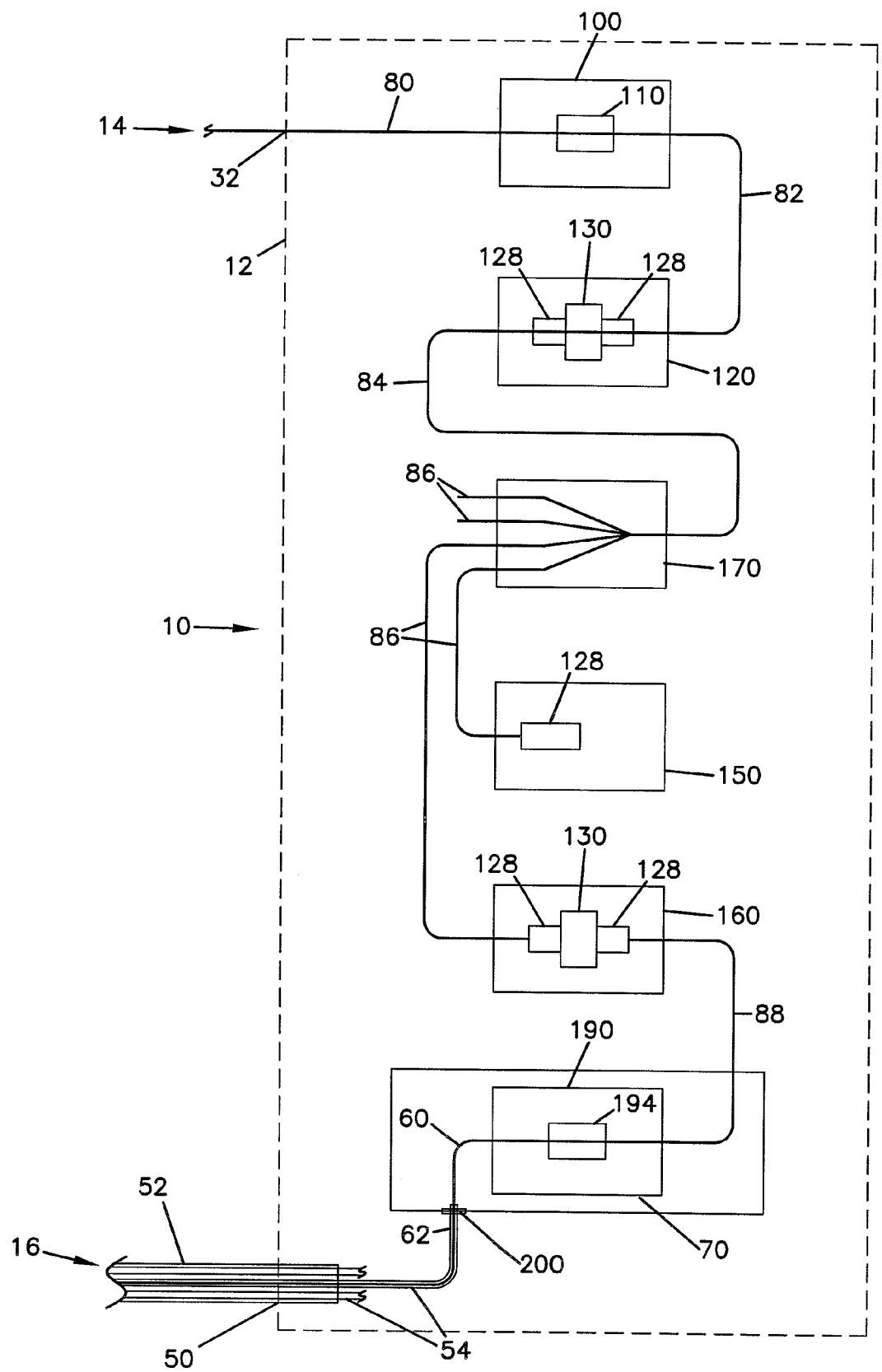
FIG. 23 is a schematic view showing the various elements of the cabinet of FIG. 1.

Referring now to FIGS. 9, 10 and 23, feeder pigtails 82 are shown being connected to splitter input cables 84 in a connector drawer 120. Connector drawer 120 includes a chassis 122 and a moveable tray 124. Mounted on tray 124 is a plurality of terminations of 126. Terminations 126 include a connector 128 on the end of each feeder pigtail 82 and each splitter input cable 84 which are joined together in an adapter 130.

Splice drawer 100 and connector drawer are mounted to panel 36 at mounting strips 39 which receives fasteners. Further features of splice drawer 100 and connector drawer 120 are shown and described in greater detail in U.S. Pat. Nos. 6,438,310, 6,504,988, and 7,079,744, the disclosures of which are hereby incorporated by a reference.

Figure 14:
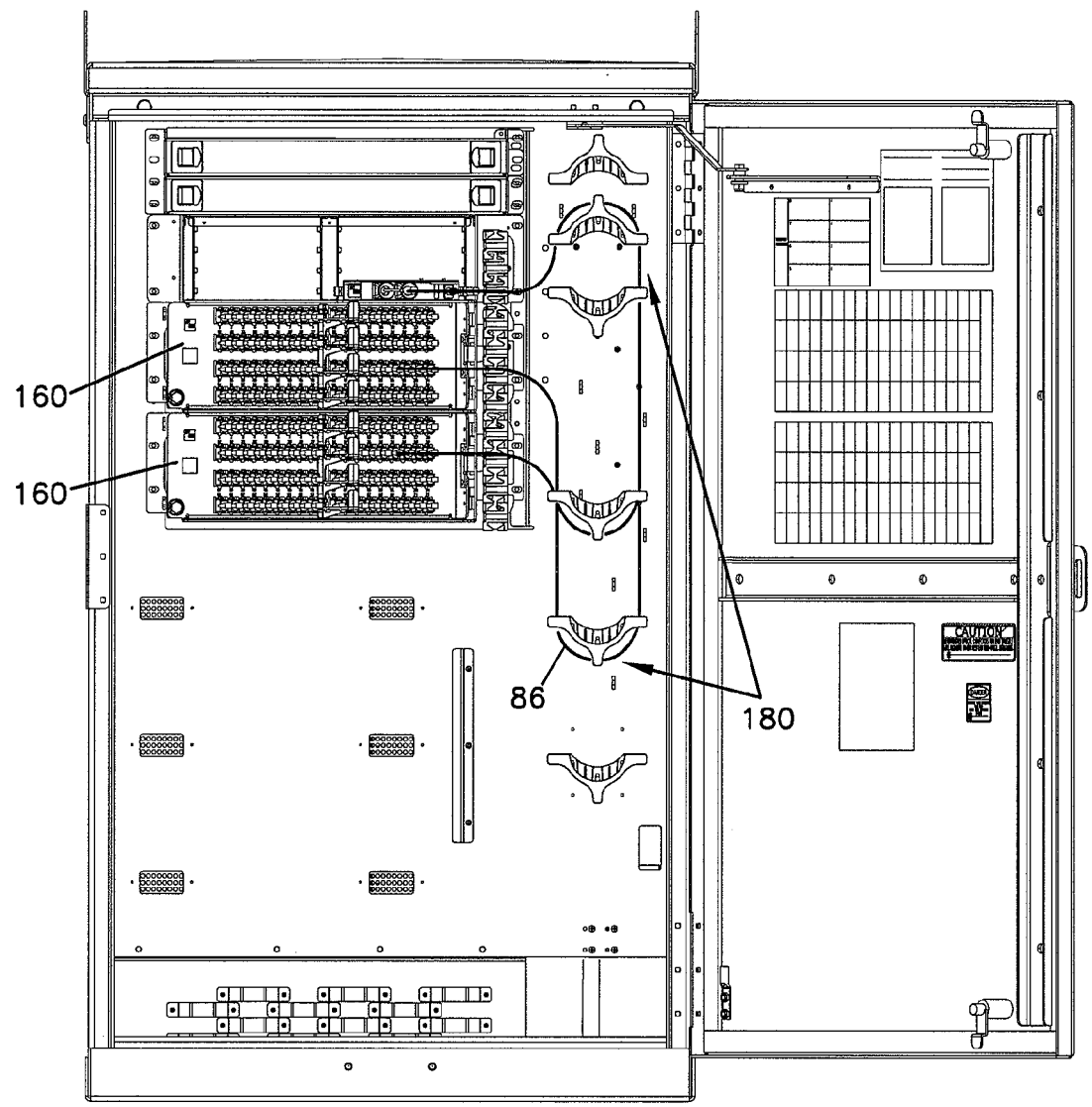
FIG. 14 is a front elevational view of the cabinet of FIG. 1, showing splitter output cables routed to two connector panels.

Referring now to FIGS. 11-14, splitter input cables 84 are shown being split into splitter output cables 86 which are either stored in a fiber storage device 150 (FIG. 13) or terminated to other cables at connector panel 160 (FIG. 14). Each splitter module 170 includes an input port 172 and one or more output ports 174 in the illustrated embodiment. For example, each splitter module 170 can split a splitter input cable 84 into a plurality of splitter output cables 86, such as a 1×32 splitter. Splitter modules 170 are mounted in a chassis 176 which mounts to mounting strips 39 with fasteners. A cable manager 180 helps manage slack associated with splitter output cables 86.

When splitter output cables 86 are not yet needed for connection to downstream equipment, storage panel 150 is used to hold each splitter output cable 86. Preferably, each splitter output cable 86 includes a connector 128. Preferably, connector storage panel 150 can receive each connector 128, or a group of connectors, including a dust cap over an end of a ferrule associated with connector 128. Further features of exemplarily connector storage panels 150 and holders are shown and described in U.S. Pat. No. 7,218,827, the disclosure of which is hereby incorporated by reference.

Figure 15:
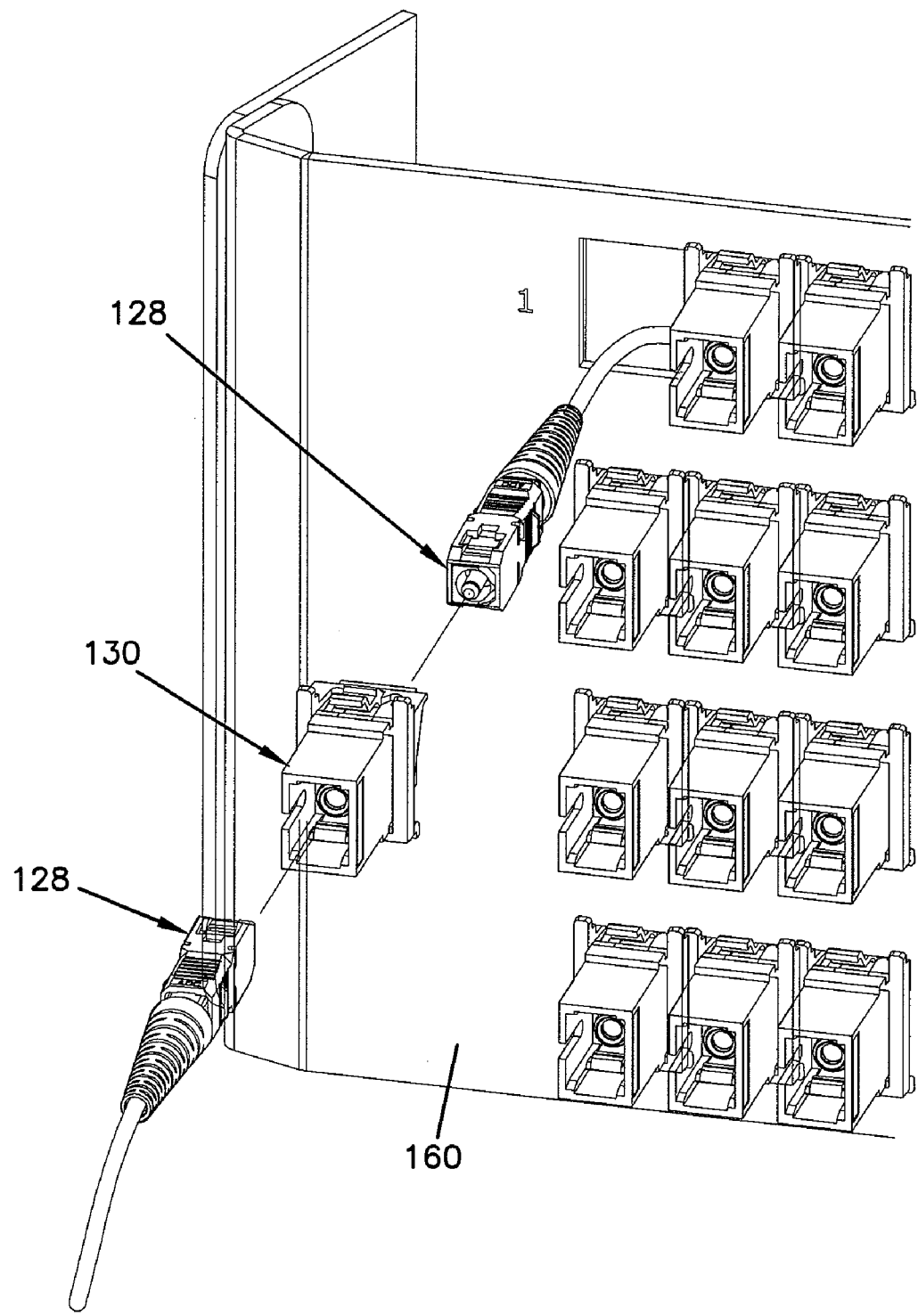
FIG. 15 is an enlarged view of a portion of one of the connector panels showing a connection between a splitter output cable and a distribution pigtail.
Figure 16:
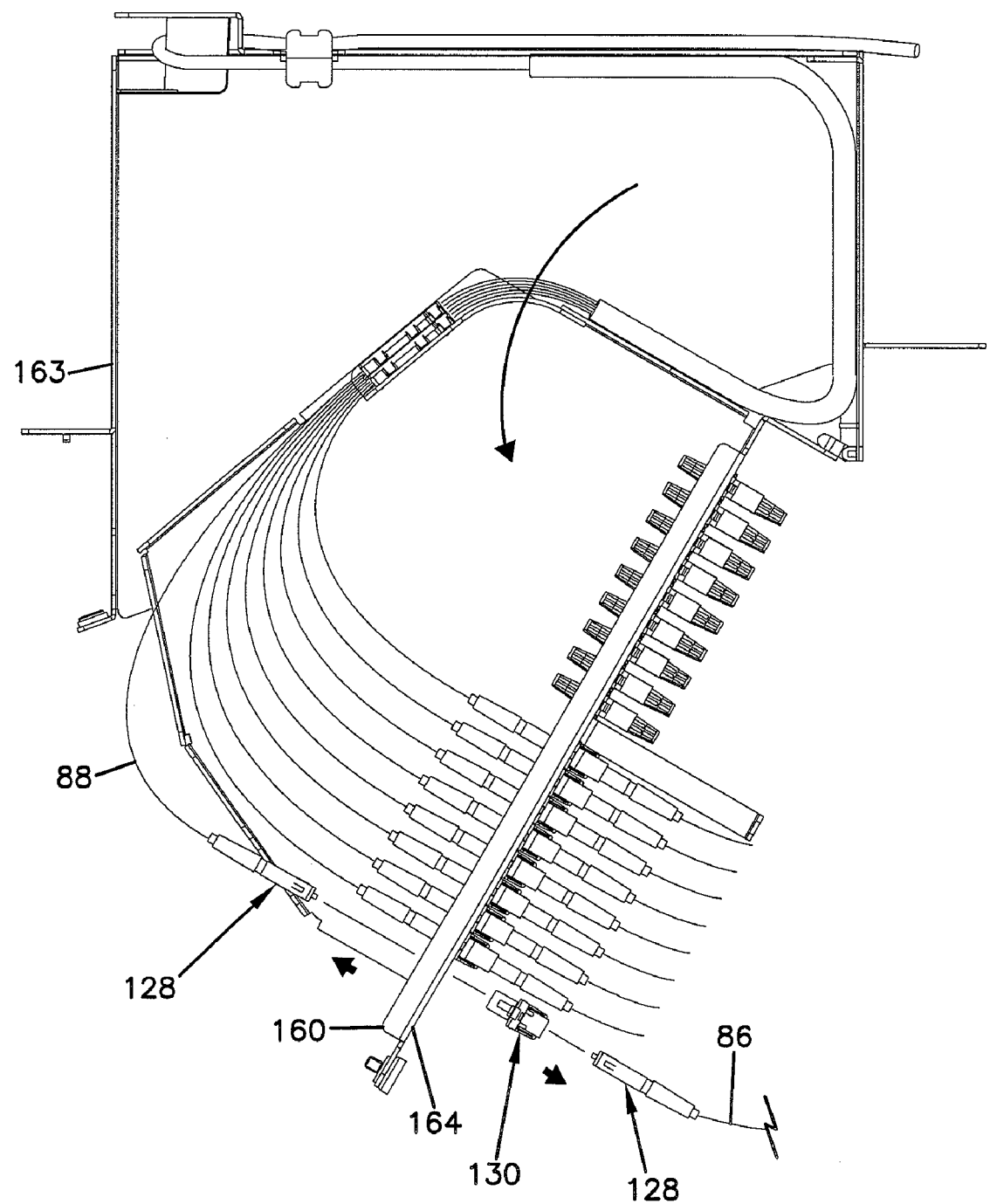
FIG. 16 is a top view of one of the connector panels.
Figure 17:
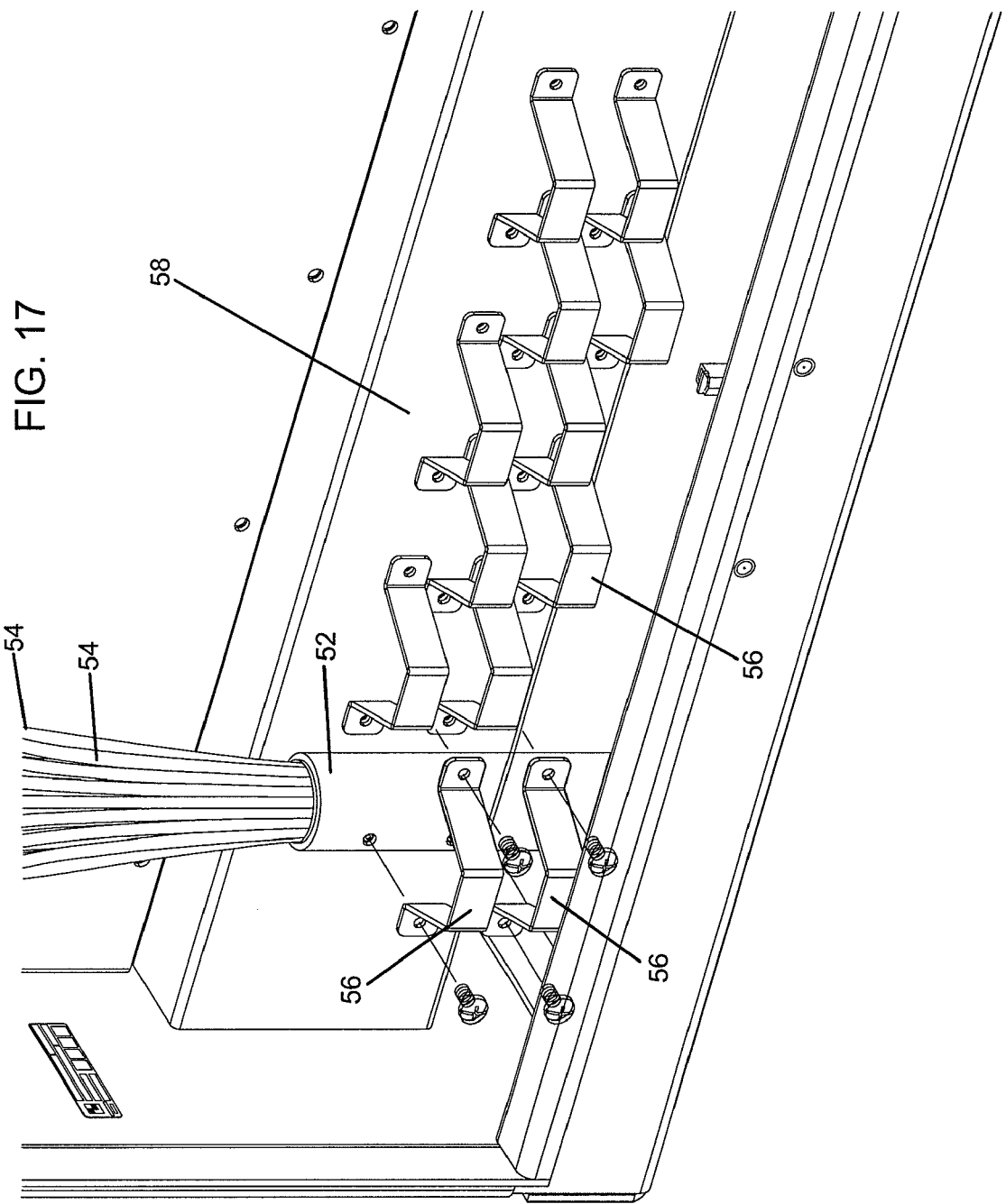
FIG. 17 is an enlarged perspective view of a lower portion of the cabinet of FIG. 1, showing clamping of a conduit to the cabinet, and including microducts extending from the conduit.
Figure 18:
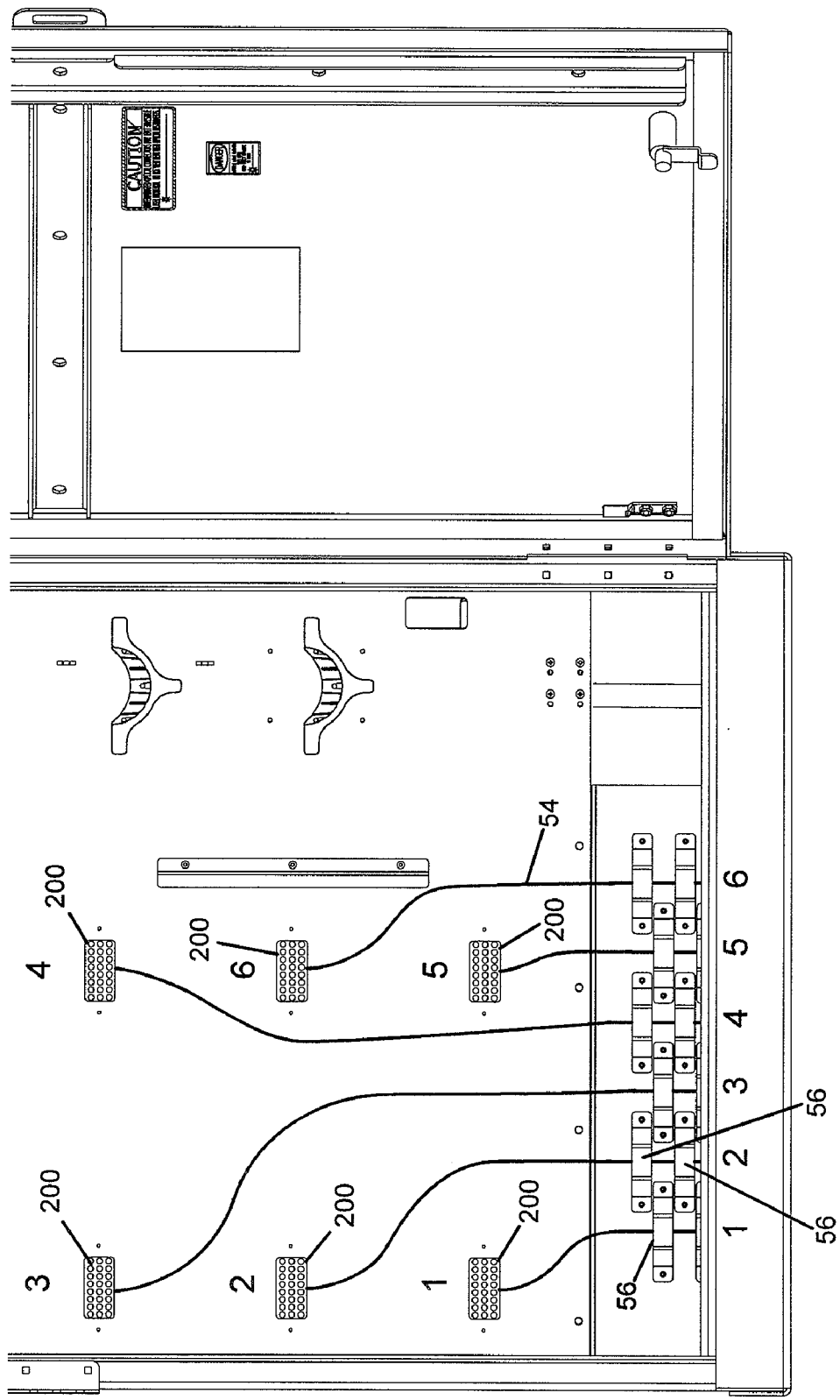
FIG. 18 is a front elevational view of the cabinet of FIG. 1, showing various conduits and microducts extending to microduct holders.
Figure 19:
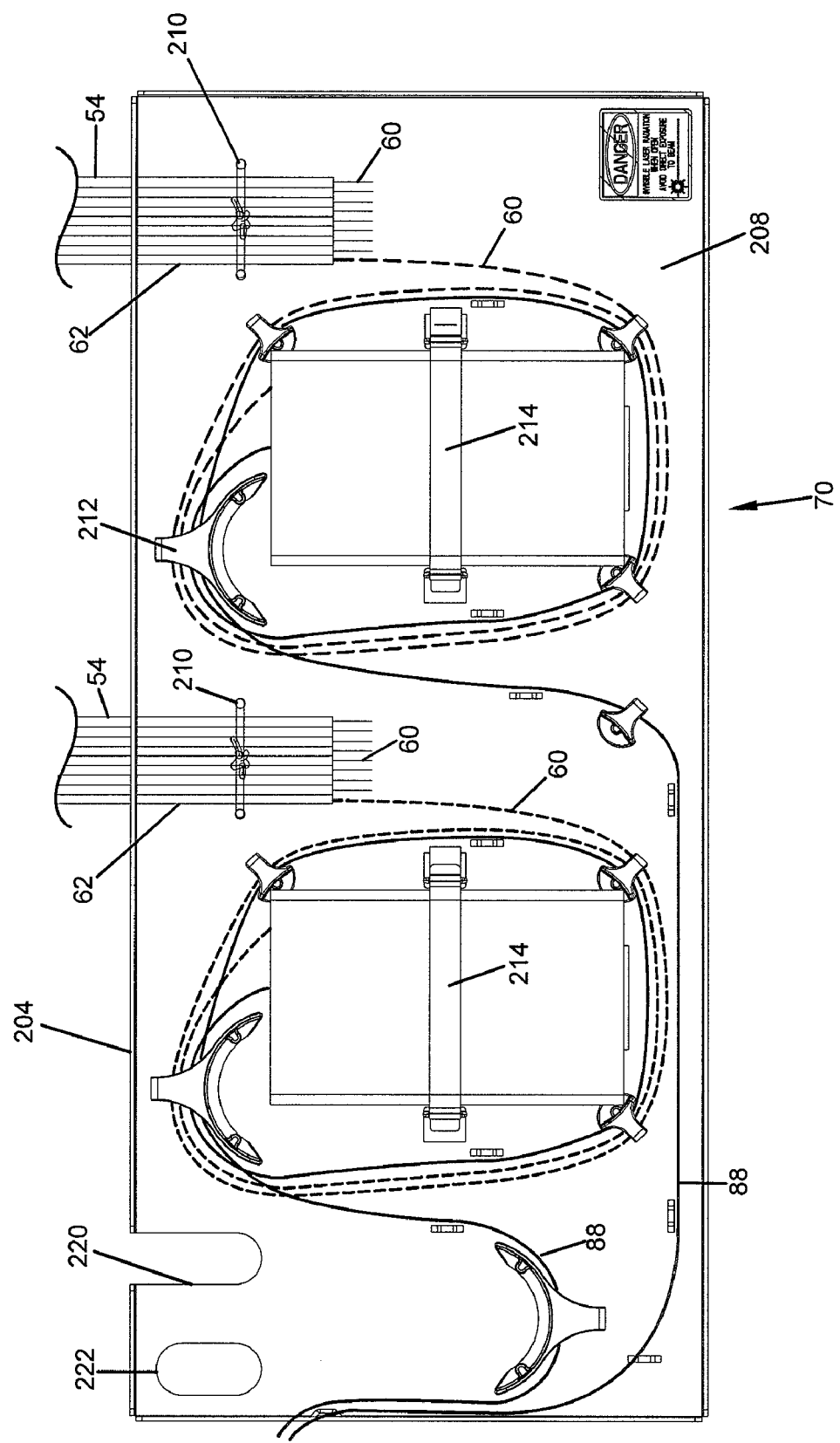
FIG. 19 is a top view of one of the shelves of the cabinet of FIG. 1, showing connections between distribution pigtails and fibers extending from the microducts at splice trays.
Figure 20:
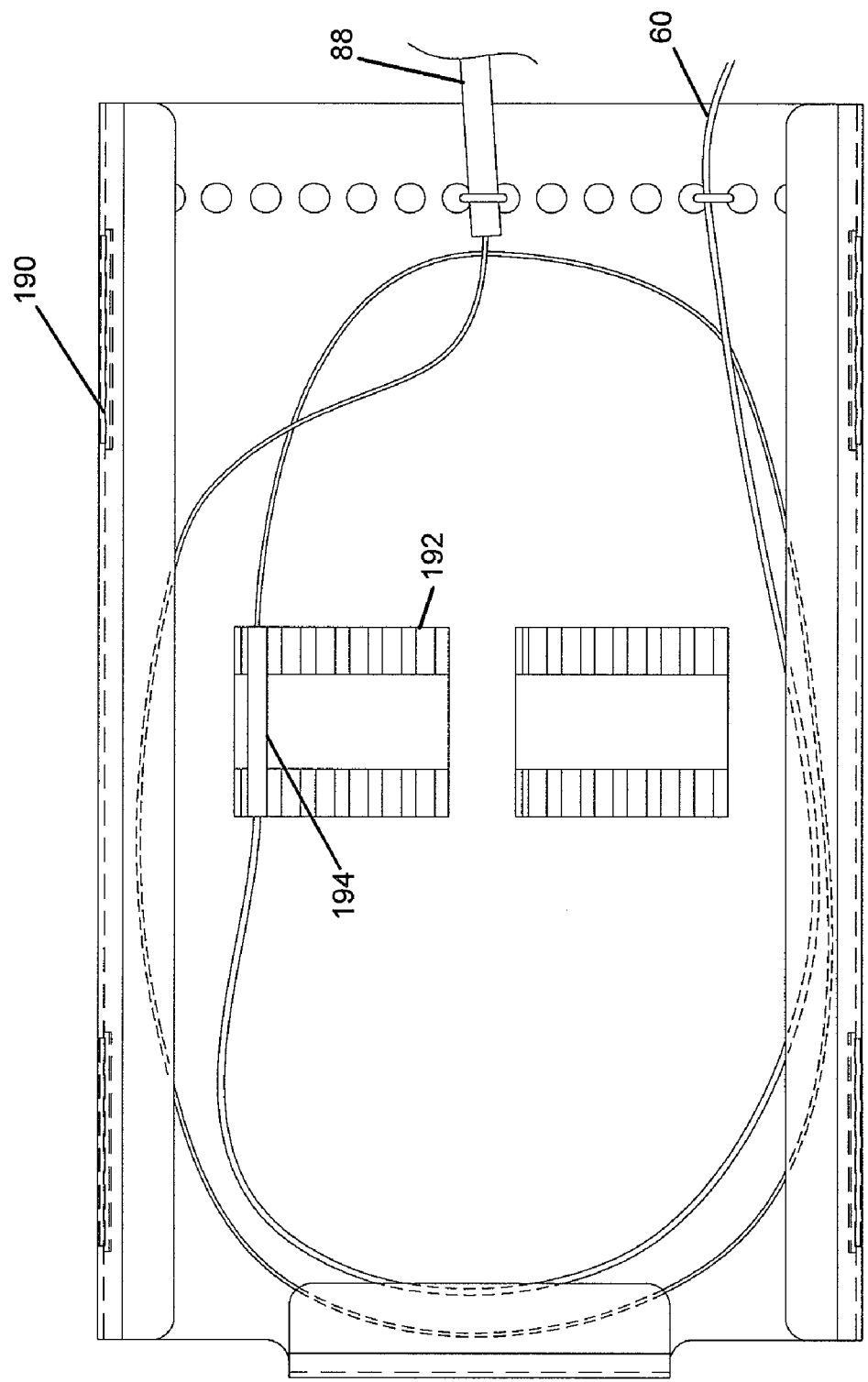
FIG. 20 is a top view of one of the splice trays of the shelf of FIG. 19, showing one fiber splice.
Figure 21:
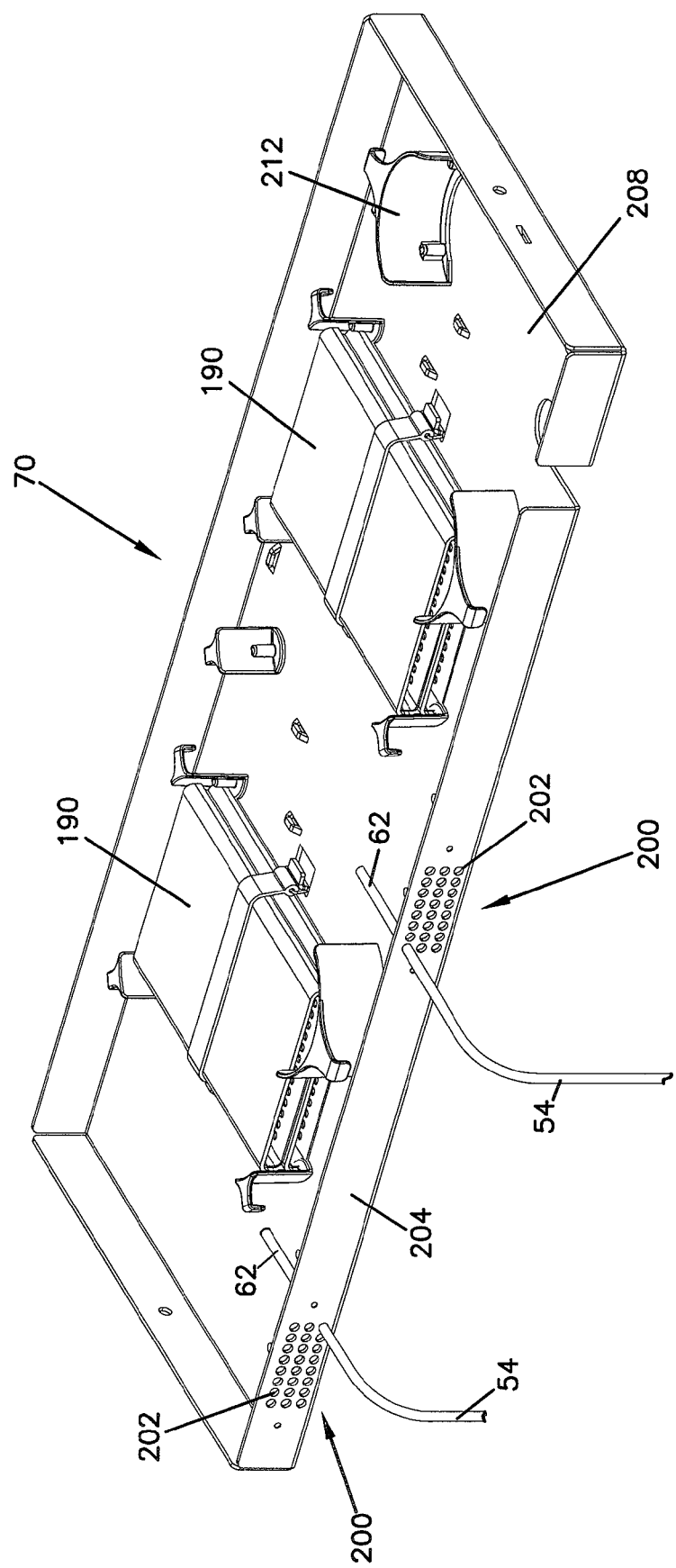
FIG. 21 is a front perspective view of one of the shelves.
Figure 22:
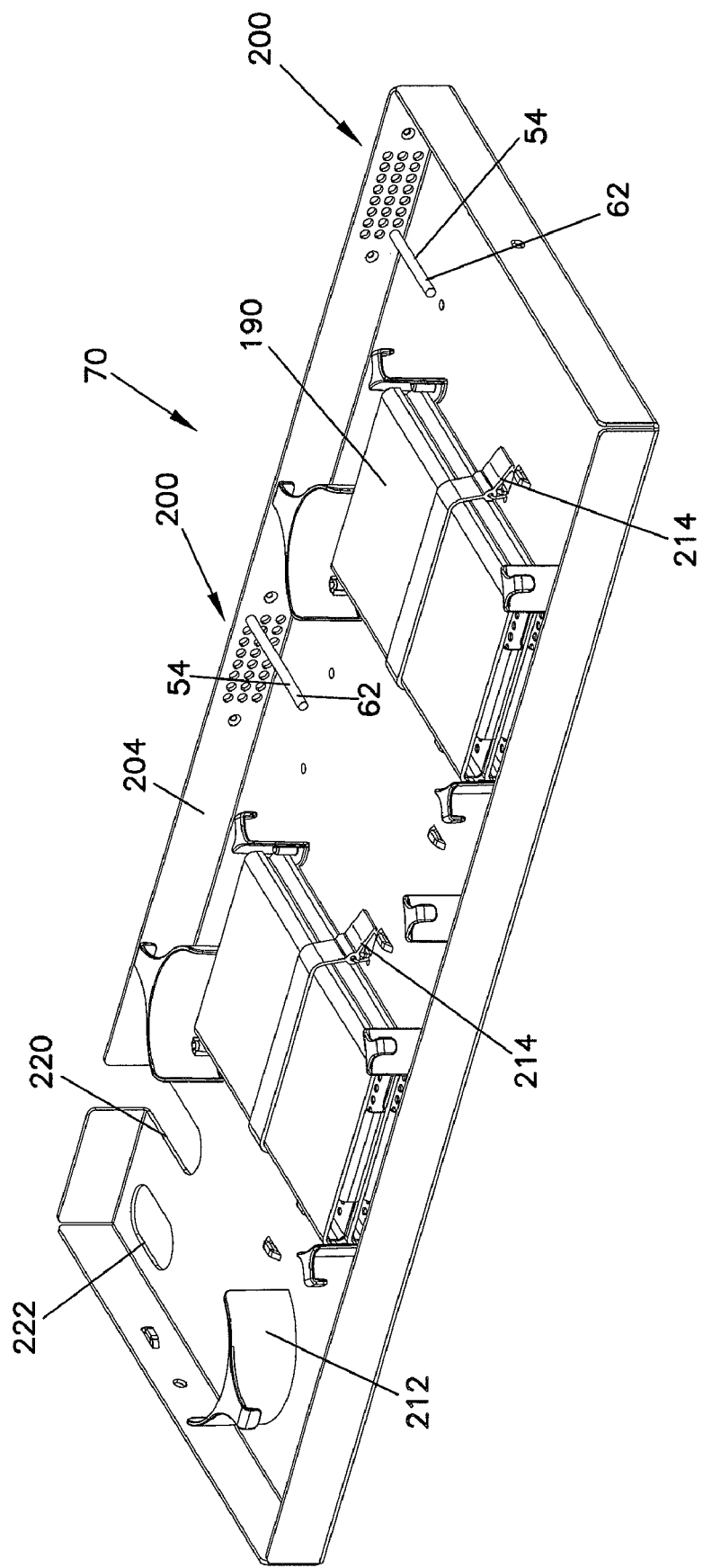
FIG. 22 is a rear perspective view of the shelf shown in FIG. 21.

When a downstream connection is desired, a splitter output cable 86 is removed from connector storage panel 150 and connected to a front of connector panel 160. Referring now to FIGS. 15 and 16, connector panel 160 includes a plurality of adapters 130 for joining two connectors 128. Once connected, splitter output cable 86 is optically linked to a distribution pigtail 88 which is led from connector panel 160 to one of shelves 70. Connector panel 160 in the illustrated embodiment has a chassis 163 mounted to mounting strips 39 with fasteners, and a pivoting panel 164 for holding the adapters 130. A cable manager 182 (FIG. 4) manages distribution pigtails 88 between connector panels 160 and shelves 70.

Referring now to FIGS. 17-22, distribution pigtails 88 are joined to fibers 60 through splice tray 190 on each shelf 70. Each shelf 70 includes a microduct holder 200 which holds an end 62 of one of the microducts 54. Specifically, microduct holder 200 includes a plurality of holes 202 which are sized to closely surround an exterior of each microduct 54. The circular periphery defined at each hole 202 engages an exterior of the microduct 54 to frictionally hold the microduct relative to shelf 70. In the illustrated embodiment, microduct holders 200 are shown positioned in a side plate 204 of each shelf 70. The holes 202 can be punched from sheet metal. If desired, an insert can be mounted to shelf 70, or to a vertical panel adjacent to shelf 70 so as to provide the circular holes 202 separate from shelf 70. Also, a variety of microducts 54 can be used. A differently sized microduct holder 200 is utilized for different microducts. For example, an outside diameter of the microducts can vary from 3 millimeters, to 5 millimeters, to 7 millimeters. To facilitate insertion, an end 62 of each microduct 54 is provided with a tapered shape (45 degree angle) so as to permit easier insertion in each hole 202. This can be cut off square as desired after insertion. In the case of a 5 millimeter duct, a hole having a diameter of 0.189 inches +/−0/0.002 inches will allow insertion of each duct without excessive effort or damage to the duct, and then retain each duct with sufficient retention force.

On a base 208 of each shelf 70 a tie device 210 can be provided for tying ends 62 of microducts 54 to each other or to each shelf 70. Base 208 of each shelf 70 further includes cable radius limiters 212 for managing the cables on each shelf 70. Shelf 70 further includes splice tray mounts 214 for holding splice trays 190 on shelves 70. Each splice tray 190 includes a splice chip 192 for holding a splice 194 used to join each distribution pigtail 88 to each fiber 60.

Each shelf 70 further includes a slot 220 for use in passing first cable 14 from base 17 to splice drawer 100 located adjacent a top 21 of cabinet 10. Shelves 70 further include an aperture 222 for allowing distribution pigtails 88 to pass to the appropriate shelf 70 for connection to the fibers 60 located on each shelf 70.

In this manner, microducts 54 can be installed to cabinet 10, and the blown fiber inserted later. It is anticipated that the blown fiber can be inserted from either end of microduct 54, either at end 62, or at the remote end disposed at the remote site.

Cabinet 10 manages the feeder cables 14 and the duct 54 of the distribution cable 16, so that a user can install blown fiber at a later date, and then make appropriate connection to the feeder cable, such as with a splice on shelf 70. The other functions provided by cabinet 10 also allow ease of use, such as the access provided by each of drawers 100, 120, splitters 170, connector panel 160, as well as the various cable managers.

What is claimed is:

1. A telecommunications fiber optic distribution cabinet comprising:

an enclosure defining an interior and extending between a base and a top, and further defining a vertical axis extending between the base and the top, the enclosure having a vertical panel and defining a microduct area on a first side of the vertical panel, wherein first and second cable entries are defined by the enclosure;

a plurality of shelves disposed in the interior of the enclosure in a stacked arrangement parallel to the vertical axis and positioned on an opposite side of the vertical panel, each shelf including:

a plurality of cable splices;

a vertical holder having a plurality of holes, each hole defining a periphery, the vertical holders being positioned on the vertical panel;

a plurality of microducts disposed in the plurality of holes of the vertical holder, wherein the periphery of each hole is frictionally engaged with one of the microducts; and a first cable pathway extending from the base vertically upward through each shelf toward an upper portion of the enclosure.

2. The cabinet of claim 1, wherein the periphery of each hole is circular.

3. The cabinet of claim 1, wherein each vertical holder includes a planar sheet metal portion including the plurality of holes through the planar sheet metal portion.

4. The cabinet of claim 1, wherein the vertical holders are positioned on the vertical panel.

5. cabinet of claim 1, further comprising a second cable pathway extending from the base vertically on the first side of the vertical panel.

6. cabinet of claim 5, further comprising a cable clamp for clamping a vertically extending cable extending in the second cable pathway, the second cable including a plurality of the microducts.

7. The cabinet of claim 1, wherein the plurality of holes of each shelf are arranged in a plurality of rows and columns.

8. The cabinet of claim 1, wherein an end of each microduct is tapered.

9. The cabinet of claim 1, wherein the vertical holder is an insert mounted to the shelf.

10. A telecommunications fiber optic distribution cabinet comprising:

an enclosure having a base and a top, the enclosure defining an interior and first and second cable entries;

a plurality of shelves disposed in the interior of the enclosure in a stacked arrangement each shelf including:

a base defining a slot, the slots of the plurality of shelves cooperatively defining a cable pathway;

a plurality of cable splices;

a microduct holder having a plurality of holes, wherein each hole defines a periphery; and a plurality of microducts disposed in the plurality of holes of the microduct holder, wherein the periphery of each hole is frictionally engaged with one of the microducts; and a plurality of optical fibers disposed in the plurality of microducts.

11. cabinet of claim 10, wherein the microduct holder is positioned on a side plate of the shelf.

12. cabinet of claim 10, wherein the plurality of cable splices is mounted to the base.

13. cabinet of claim 10, wherein each of the plurality of shelves includes a plurality of cable radius limiters disposed on the base.

14. cabinet of claim 10, wherein the base of each of the plurality of shelves defines an aperture for allowing distribution pigtails to pass to one of the shelves.

* * * * *

UNITED STATES PATENT AND TRADEMARK OFFICE
CERTIFICATE OF CORRECTION

PATENT NO. : 7,657,148 B2
APPLICATION NO. : 11/970439
DATED : February 2, 2010
INVENTOR(S) : Kowalczyk et al.

It is certified that error appears in the above-identified patent and that said Letters Patent is hereby corrected as shown below:

Col. 5, line 28, claim 5: "cabinet of claim" should read --The cabinet of claim--

Col. 5, line 31, claim 6: "cabinet of claim" should read --The cabinet of claim--

Col. 6, line 12, claim 10: "stacked arrangement each shelf" should read --stacked arrangement, each shelf--

Col. 6, line 24, claim 11: "cabinet of claim" should read --The cabinet of claim--

Col. 6, line 26, claim 12: "cabinet of claim" should read --The cabinet of claim--

Col. 6, line 28, claim 13: "cabinet of claim" should read --The cabinet of claim--

Col. 6, line 31, claim 14: "cabinet of claim" should read --The cabinet of claim--

Signed and Sealed this

Sixteenth Day of November, 2010

David J. Kappos
*Director of the United States Patent and Trademark Office*